United States Patent [19]

Meister

[11] Patent Number: 5,677,948
[45] Date of Patent: Oct. 14, 1997

[54] CORDLESS PORTABLE HANDS-FREE TELEPHONE

[75] Inventor: Pierre-André Meister, Bienne, Switzerland

[73] Assignee: Eta SA Fabriques d'Ebauches, Grenchen, Switzerland

[21] Appl. No.: 512,755

[22] Filed: Aug. 9, 1995

[30] Foreign Application Priority Data

Aug. 23, 1994 [FR] France .................. 94 10206

[51] Int. Cl.⁶ .................. H04M 15/06; H04M 1/60; H04M 1/00
[52] U.S. Cl. .................. 379/142; 379/174; 379/354; 379/457
[58] Field of Search .................. 379/58, 61, 142, 379/430, 457, 174, 447, 449, 354; 455/89, 90, 100, 351; 381/122, 169, 187, 188

[56] References Cited

U.S. PATENT DOCUMENTS

| | | | |
|---|---|---|---|
| 3,654,406 | 4/1972 | Reinthaler | 381/187 |
| 3,868,572 | 2/1975 | Kaufman | 455/90 |
| 4,040,547 | 8/1977 | Dickey | 381/169 |
| 4,160,879 | 7/1979 | Sullivan | 379/447 |
| 4,241,242 | 12/1980 | Yeh | 379/449 |
| 4,591,661 | 5/1986 | Benedetto et al. | 379/61 |
| 4,654,883 | 3/1987 | Iwata | 379/430 |
| 4,741,030 | 4/1988 | Wilson | 379/368 |
| 4,882,745 | 11/1989 | Silver | 379/61 |
| 4,893,344 | 1/1990 | Tragardh et al. | 379/430 |
| 4,930,148 | 5/1990 | Lee | 379/58 |
| 4,972,468 | 11/1990 | Murase | 379/430 |
| 4,993,065 | 2/1991 | Chiou | 379/430 |
| 5,113,428 | 5/1992 | Fitzgerald | 379/61 |
| 5,155,759 | 10/1992 | Saegusa | 379/142 |
| 5,457,751 | 10/1995 | Such | 381/187 |

FOREIGN PATENT DOCUMENTS

| | | |
|---|---|---|
| 9200683 | 4/1992 | Germany . |
| 2074817 | 11/1981 | United Kingdom . |

*Primary Examiner*—Sinh Tran
*Assistant Examiner*—Vijay Shankar
*Attorney, Agent, or Firm*—Griffin, Butler, Whisenhunt & Kurtossy

[57] ABSTRACT

A cordless portable telephone comprises a main apparatus (2) combining a receiver, a transmitter, an antenna (3) and a keyboard for entering a called number, a microphone and an earpiece, all attached to, or supported from a collar passing around the neck of a user.

6 Claims, 3 Drawing Sheets

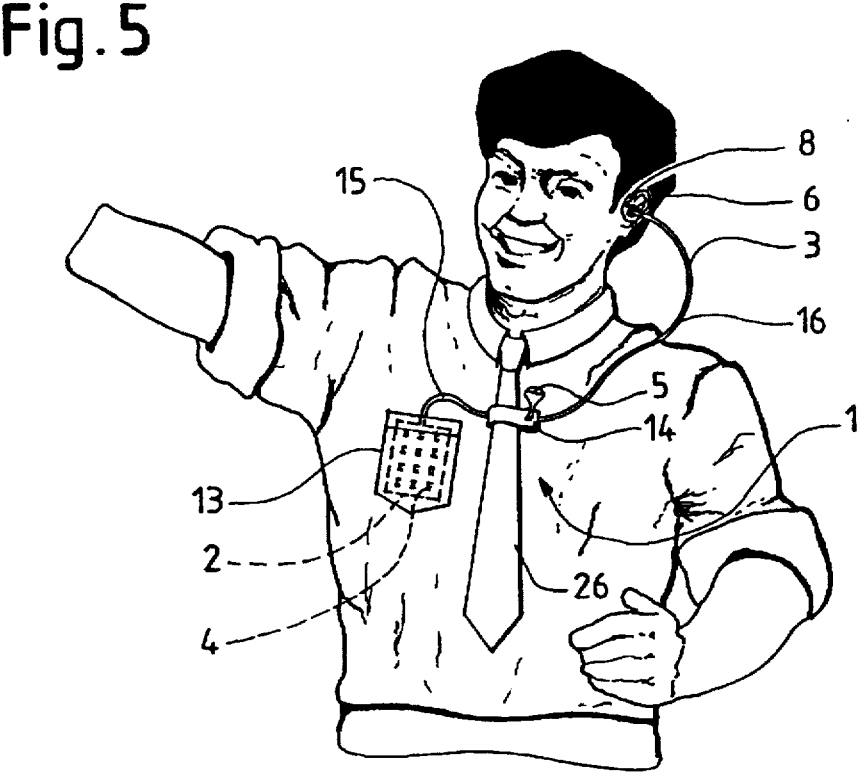

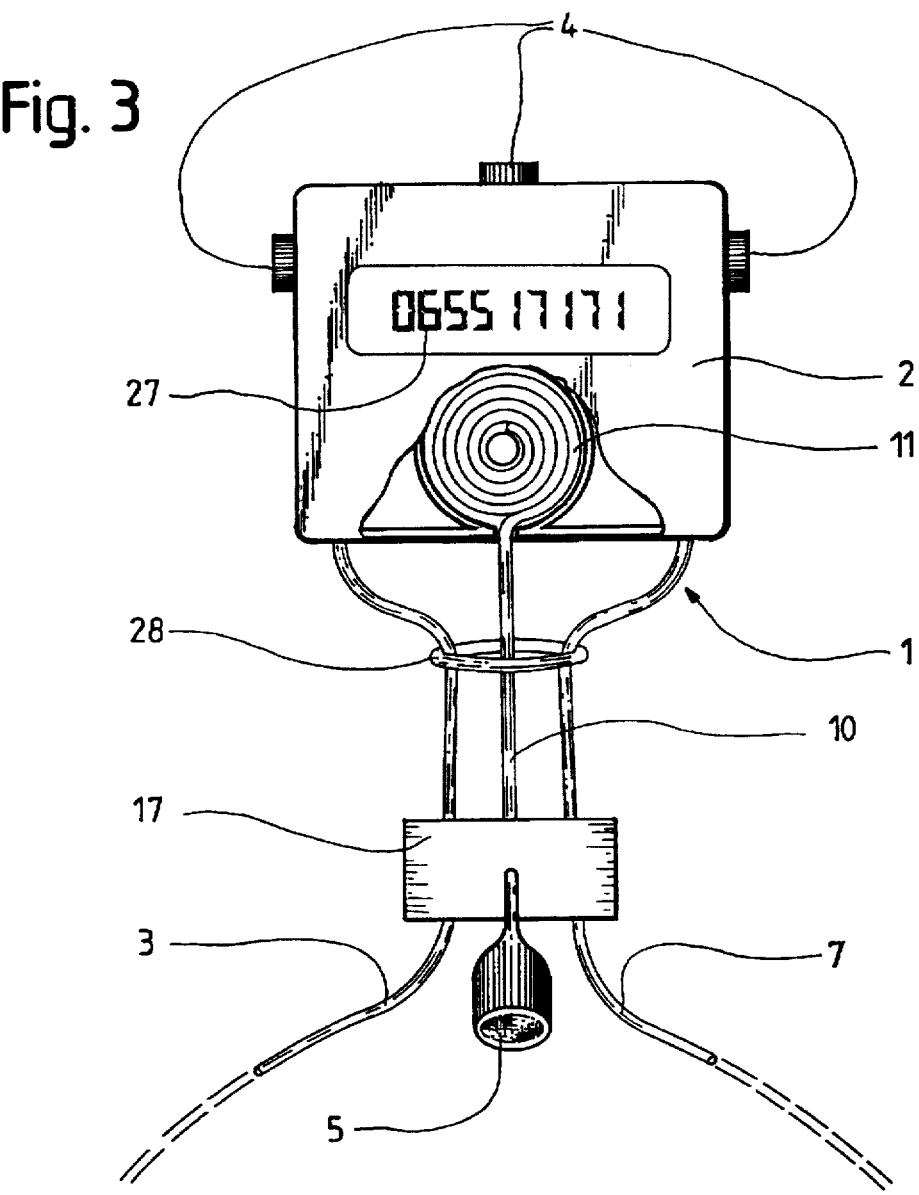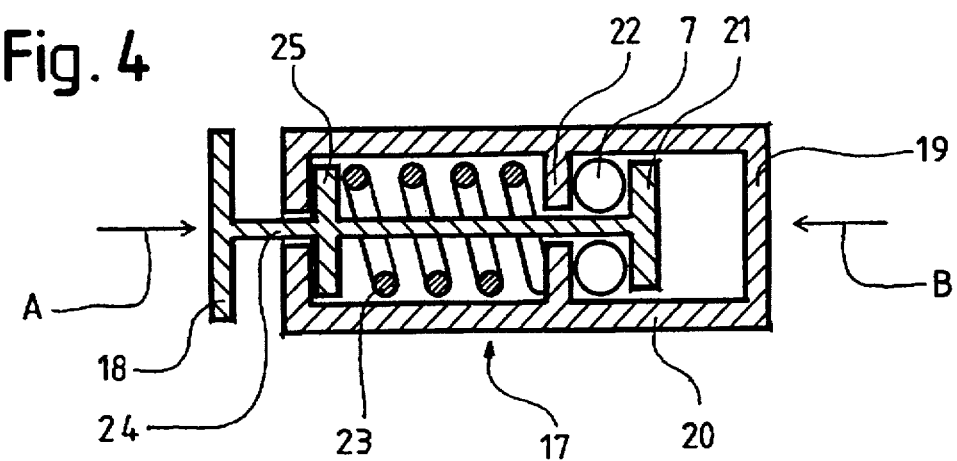

CORDLESS PORTABLE HANDS-FREE TELEPHONE

FIELD OF THE INVENTION

The instant invention relates to a cordless portable telephone comprising a main apparatus combining reception and transmission means provided with an antenna and means for composing a number to be called, a microphone and at least one ear-piece.

BACKGROUND OF THE INVENTION

Telephones according to the general concept set out above have already been proposed either for a cordless portable telephone for short distances (a few hundred meters according to the CT2 standard) or for long distances (according to DECT or GMS standards). Such apparatus generally comprises a hand-held apparatus applied to the ear. It has an ear-piece and a microphone, the ear-piece and the microphone being separated by a zone comprising the means for composing the called number, in particular a keyboard. The device is provided with an antenna that may or may not be telescopic. An apparatus of this kind is not very ergonomic in the sense that it has to be continuously held in one hand, this latter therefore not being available for fulfilling other occupations, for example for consulting files during the telephone conversation. It should be added that an apparatus of this kind is heavy and bulky, causing muscle fatigue, particularly for people whose main occupation lies in using a telephone. Finally, there is the risk that the antenna could be damaged while the apparatus is being handled.

Radio transmission means are also known composed of a headphone and a microphone attached to this headpiece and used, for example, by sports reporters. However, this system is not a telephone and therefore does not have any means for composing a called number.

SUMMARY OF THE INVENTION

An object of the present invention is to provide a portable telephone adapted to be worn on the human body, leaving the hands free.

Another object of the invention is to provide a portable cordless telephone comprising a main apparatus combining reception and transmission means, an antenna and means for composing a telephone number to be called, a microphone and at least one ear-piece, the portable cordless telephone being adapted to be worn on the human body, leaving the hand free, and characterized in that the main apparatus is suspendable from a collar passing around the neck of the user, and that the microphone is fixed to a device sliding along the collar to facilitate adjustment of the distance separating the microphone from the mouth.

Other features and advantages of the invention will emerge from study of the description of two specific embodiments of the instant invention. The following description made with reference to the appended drawings is given solely by way of example.

BRIEF DESCRIPTION OF DRAWINGS

FIG. 1 shows a cordless portable telephone according to a first embodiment of the invention, FIG. 3 shows a detail of part of the telephone of FIG. 1, this detail being a variant of the embodiment of FIG. 2, FIG. 4 shows a mechanism for attaching the microphone suitable for equipping the systems shown in FIGS. 1, 2 and 3, and FIG. 5 shows a cordless portable telephone according to a second embodiment of the invention.

DESCRIPTION OF PREFERRED EMBODIMENTS

Figure 2:
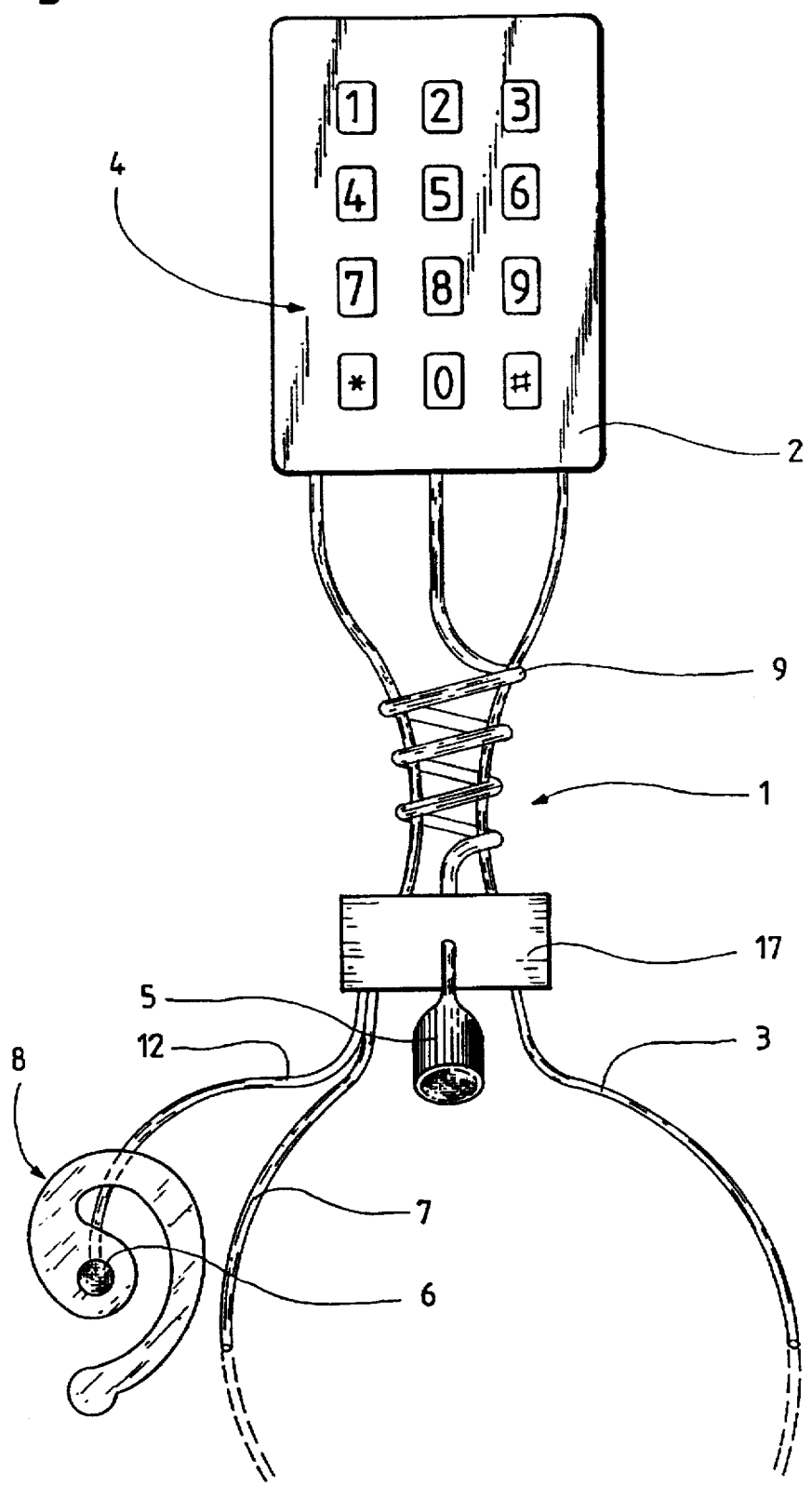
FIG. 2 shows a detail of part of the telephone of FIG. 1.

In the case of either of the two embodiments according to FIGS. 1 and 5 respectively, the cordless portable telephone 1 has a main apparatus 2. This apparatus comprises conventional reception and transmission means provided with an antenna 3. The main apparatus has means (also known) 4 for composing a called number, in this case a keyboard. A microphone 5 and an ear-piece 6 are connected to the main apparatus 2.

As clearly shown in FIGS. 1 and 5, the telephone 1 is worn on the human body, leaving the hands free.

More specifically, FIG. 1 shows that the main apparatus is attached to a collar 7 passing around the neck of the user. This is the first embodiment of the invention. In the embodiment, the microphone 5 is fixed to a device 17 sliding along the collar 7 to make it possible to adjust the distance separating said microphone from the mouth of the user. The sliding device 17 makes it possible to find an optimum distance, i.e. that achieving an ideal compromise between, on the one hand, a good acoustic result and, on the other hand, a convenient position with respect to the clothing worn by the user. FIG. 1 also shows that the ear-piece 6 is of the hearing aid type, for example that shown with reference numeral 8 on FIG. 2.

Reference now being made to FIG. 2 showing in detail the configuration of the cordless portable telephone, it will be noted that the main apparatus 2 is provided with means for composing a called number which consist of a keyboard 4 which has, in addition to the numbers 0 to 9, the functions star * and hash # which are conventional in modern appliances. The device 17 sliding on the collar 7 carries the microphone 5 which is connected to the main apparatus 2 by means of a spiral cable 9 around the collar. It will be understood that the diameter of the spiral is reduced when the device 17 is brought close to the mouth of the user or, in contrast, is increased when this device is moved away from said mouth. This thereby avoids a dangling connection between the device 17 and the apparatus 2 which could present the disturbing risk of catching. FIG. 2 also suggests including an antenna 3 in the collar 7. The collar 7 provides a natural opportunity for this, making it possible to use a long antenna without the risk of any deterioration. Finally, FIG. 2 shows that the ear-piece 6 is connected to the main apparatus 2 by means of a cable 12 running partially alongside the collar 7. It will be noted, however, that this connection could be eliminated if a radio connection were established between the earpiece 6 and the main apparatus 2. The ear-piece 6 is of the hearing aid type and is located, as shown in FIG. 2, in the centre of a flat coil 8 which is looped around the ear.

FIG. 3 is a variant compared to that shown in FIG. 2. In FIG. 3, the main apparatus 2 is provided with means for composing the called number which consists in using the keys 4 which, when they are pressed in a certain order, make it possible to compose said called number which appears on a liquid crystal cell 27. In addition, the device 17 sliding on the collar 7 carries the microphone 5 which is connected to the main apparatus 2 by means of a cable 10 retracted by an idler 11 disposed inside the apparatus 2. The cable 10 is thus permanently retained between the device 17 and the apparatus 2. To have a more compact system of cables, the use is suggested of a ring 28 in which the wires of the collar 7 as well as the cable 10 pass. In the variant of FIG. 3, the collar 7 also serves to support the antenna 3 and the ear-piece is connected to the apparatus 2 as described in FIG. 2.

FIG. 4 shows a mode of executing the device 17 which carries the microphone 5. A housing 20 retains a piston 24 having a locking disc 25 and a securing disc 21. The wires of the collar 7 are disposed between the securing disc and a pierced wall 22 integral with the housing 20. A return spring 23 disposed between the wall 22 and the disc 25 squeezes the wires of the collar 7 between said wall 22 and the disc 21. By holding the device between an outer plunger 18 having a piston 24 and the wall 19 of said device and by exerting the opposing forces illustrated by the arrows A and B, the collar 7 is released to permit said device to be slid along said collar.

FIG. 5 shows a second embodiment of the cordless portable telephone 1 of the invention. As shown in this figure, the main apparatus 2 is kept in a pocket 13 of the clothing of the user. The microphone is of the Lavalier microphone type attached by means of a clip 14 to the tie 26 of the user. This microphone could, of course, be attached to a different part of the clothing, for example to the lapel of a jacket. As in the preceding mode, the ear-piece 6 is of the hearing aid type. The microphone 5 and the ear-piece 6 are connected to the main apparatus 2 by means of cables 15 and 16. One of these cables, or both, serves to support the antenna 3.

The main apparatus 2 is a small instrument to be worn on the body. Its size may be compared to that of a chronograph suspended around the neck and intended, in particular, to time sporting events.

What is claimed is:

1. A portable cordless hands-free telephone adapted to be worn on a human body, said telephone comprising:

a main apparatus having reception and transmission means therein and a composing means thereon for composing a telephone number to be called;

an ear-piece connected to said main apparatus;

a collar having a first portion for extending around the neck of a user, said main apparatus being mounted on said collar at a location remote from said first portion so that said main apparatus may be suspended from the neck of a user;

a device slidably mounted on said collar between said first portion and said location where the main apparatus is mounted on said collar;

a microphone connected to said main apparatus, said microphone being fixed to said device so that a distance between the mouth of a user and said microphone may be maintained substantially constant without use of the hands of a user and said distance may be varied by manually sliding said device on said collar.

2. A telephone according to claim 1, characterised in that the microphone is connected to the main apparatus by means of a cable spiralled around said collar.

3. A telephone according to claim 1, characterised in that the microphone is connected to the main apparatus by means of a cable retracted by an idler disposed inside said main apparatus.

4. A telephone according to claim 1, characterised in that an antenna is provided for said reception and transmission means, said collar supporting the antenna which is at least partially disposed in said collar.

5. A telephone according to claim 1, characterised in that the main apparatus can be stored in a pocket of a user's clothing, that the microphone is of the Lavalier microphone type and that the ear-piece is of the hearing aid type.

6. A telephone according to claim 5, characterised in that the microphone and the ear-piece are connected to the main apparatus by means of cables, at least one of which supports the antenna.

* * * * *